United States Patent [19]

Curry, Jr.

[11] Patent Number: 5,027,348
[45] Date of Patent: Jun. 25, 1991

[54] METHOD AND APPARATUS FOR DYNAMIC DATA BLOCK LENGTH ADJUSTMENT

[75] Inventor: James C. Curry, Jr., Lexington, S.C.

[73] Assignee: NCR Corporation, Dayton, Ohio

[21] Appl. No.: 374,120

[22] Filed: Jun. 30, 1989

[51] Int. Cl.$^5$ ............................. H04J 3/02; H04J 3/16
[52] U.S. Cl. ....................................... 370/85.1; 370/82
[58] Field of Search ...................... 370/82, 85.1, 85.11, 370/79, 80, 91

[56] References Cited

U.S. PATENT DOCUMENTS

| | | | |
|---|---|---|---|
| 3,573,852 | 4/1971 | Watson et al. | 340/172.5 |
| 4,050,096 | 9/1977 | Bennett et al. | 364/200 |
| 4,574,350 | 3/1986 | Starr | 364/200 |
| 4,581,735 | 4/1986 | Flamm et al. | 370/85 |
| 4,586,175 | 4/1986 | Bedard et al. | 370/85 |
| 4,704,606 | 11/1987 | Hasley | 370/82 |
| 4,726,018 | 2/1988 | Bux et al. | 370/85.3 |
| 4,763,320 | 8/1988 | Rudolph et al. | 370/85 |

Primary Examiner—Douglas W. Olms
Assistant Examiner—Wellington Chin
Attorney, Agent, or Firm—Wilbert Hawk, Jr.; Stephen F. Jewett; Jack R. Penrod

[57] ABSTRACT

A method and apparatus for sensing the amount of current data traffic on a high speed parallel bus, such as a Multibus II, and dynamically adjusting the allowable length of a any data block from any bus agent to optimize bus efficiency. A data transfer activity counter or similar device counts the amount of bits transferred in a predetermined sample interval, which is decoded after every sample interval and the allowable block length adjusted. The data block lengths are preselected to optimize efficiency at various average operating conditions with the further consideration that each agent has a maximum data latency time which should not be exceeded before that agent gains access to the bus.

24 Claims, 4 Drawing Sheets

METHOD AND APPARATUS FOR DYNAMIC DATA BLOCK LENGTH ADJUSTMENT

BACKGROUND OF THE INVENTION

The present invention relates to a multiple processor electronic data processing system, and more particularly to such a system having a Multibus II or similar system bus (Multibus II is a trademark of the Intel Corporation, Santa Clara, Calif.).

A system bus performs two major functions in an electronic data processing system. First of all, it transfers data. A data transfer is typically made by sequentially transferring a group or block of words from one agent, such as a processor, a random access memory, a peripheral, etc., to another agent. This group or block of sequential words is often referred to as a data packet or a data burst. Typically, data transfers are the predominant function performed by the system bus.

The second function of the system bus is to control the next system function, such as which agent will make a data transfer. One or more control conductors are typically included as part of the system bus to interconnect the agents on the system bus. A priority and/or contention subsystem is usually included in order to provide each agent the access to the system bus that it requires.

Thus, the main function of the system data bus is to transfer data. It is logical then that bus efficiency is defined as a result of dividing an amount of time that is occupied transferring data by an amount of time that is preselected as a sample period, and subsequently converting the result into a percentage. With such a definition, when the bus system is in the midst of an extremely lengthy data block transfer, the measured bus efficiency will approach one hundred per cent. Thus, as a general rule for meaningful efficiency measurements, the duration of the sample period should be somewhat greater than the duration of the longest data block.

The control function, on the other hand, is typically viewed as a necessary evil. The time periods that are used to manage and apportion the utilization of the system bus are generally grouped together and referred to as overhead. Overhead is the remainder when the data transfer efficiency is less than one hundred per cent.

From an efficiency standpoint, the ideal electronic data system would store up data, wait for access to the system data bus, and then transfer data between agents in very large blocks. Unfortunately, most systems cannot operate in that manner. Systems which have only a single processor typically cannot have the processor monopolized with data transfers concerning a single agent to the exclusion of the other agents within the system. Similarly, systems with a single system bus cannot have the system bus monopolized by two agents constantly transferring lengthy data blocks between each other. It is axiomatic that all the other agents cannot wait forever; because, if the other agents could wait forever there would not be any reason to include them into the system in the first place. This means that each agent must be afforded a periodic opportunity to transfer data over the system bus.

Thus, on one hand is the ideal of one hundred per cent efficiency of the system data bus, and on the other hand is the reality that data transfers must be short enough to allow each agent on the system bus periodic access to the bus. To achieve high data transfer efficiency, a small number of lengthy data blocks are desirable; but to achieve a high accessibility among agents, a large number of short data blocks are desirable. The problem of the system designer is how to balance these two competing demands. This balancing problem has been accentuated by the fact that the block length is almost universally fixed by the operating system hardware or software and cannot be changed without a hardware or software change. Since it is all but unchangeable, a data block length is typically selected to provide each agent with sufficient data transfer time periods occurring with sufficient frequency to meet essential control and data transfer requirements. After all the essential requirements have been met, and if any bus capability remains, the length of the data blocks may then be selected to optimize the data transfer efficiency for what is considered to be the typical operating condition. If this approach followed, the result is that the system bus has only a single data block length available. This single block will of necessity be a compromise between bus efficiency and data latency considerations.

Thus, it is an object of the present invention to provide a data system bus which may be optimized for a plurality of differing operating conditions.

It is another object of the present invention to provide each agent of a data system bus with means to select a data block length that is closest to the optimal data block length for that agent's next data transfer.

It is a further object of this invention to provide a method for selecting a block length that is closest to the optimal data block length for the agent's next data transfer.

SUMMARY OF THE INVENTION

According to one aspect of the invention, the foregoing objects are achieved by providing a bus block length selection apparatus for use with a data bus having a clock signal and a data-transfer-in-process signal. The apparatus includes a time base circuit connected to the clock signal for providing an output control pulse after a preselected sample period; an accumulator circuit responsive to the output control pulse for accumulating a total of the clock signals occurring within each preselected sample period and outputting a digital signal representative of that total; and a decoder circuit responsive to the output control pulse and to the digital signal output for decoding the digital output into a form which selects, according to the total of the clock signals accumulated in the preselected sample period, an appropriate length for the next bus data block.

In accordance with a second aspect of the invention, the foregoing objects are achieved by providing a method for controlling a length of a data block of a data bus. The method includes the steps of counting a preselected number of cycles of a data bus reference clock; generating a control pulse when the preselected number of cycles has been counted; counting a second number of cycles of the data bus reference clock that occur concomitantly with a datatransmission-in-process signal of the data bus to measure a level of data block traffic during the preselected number of cycles; outputting a plurality of binary signals corresponding to a plurality of most significant bits of the second number; storing the plurality of binary signals in a storage means controlled by the control pulse; and decoding the binary signals stored in the storage circuit for selecting the length of a subsequently transmitted data block to optimally operate the data bus.

BRIEF DESCRIPTION OF THE DRAWINGS

While the specification concludes with the appended claims particularly pointing out and distinctly claiming the subject matter which is regarded as the invention, it is believed that the invention will be better understood from the following detailed description of the illustrative embodiment taken in conjunction with the accompanying drawings in which:

DETAILED DESCRIPTION OF A PREFERRED EMBODIMENT

In reference to the figures, similar designations denote similar elements among the block diagrams as well as the timing diagrams.

Figure 1:
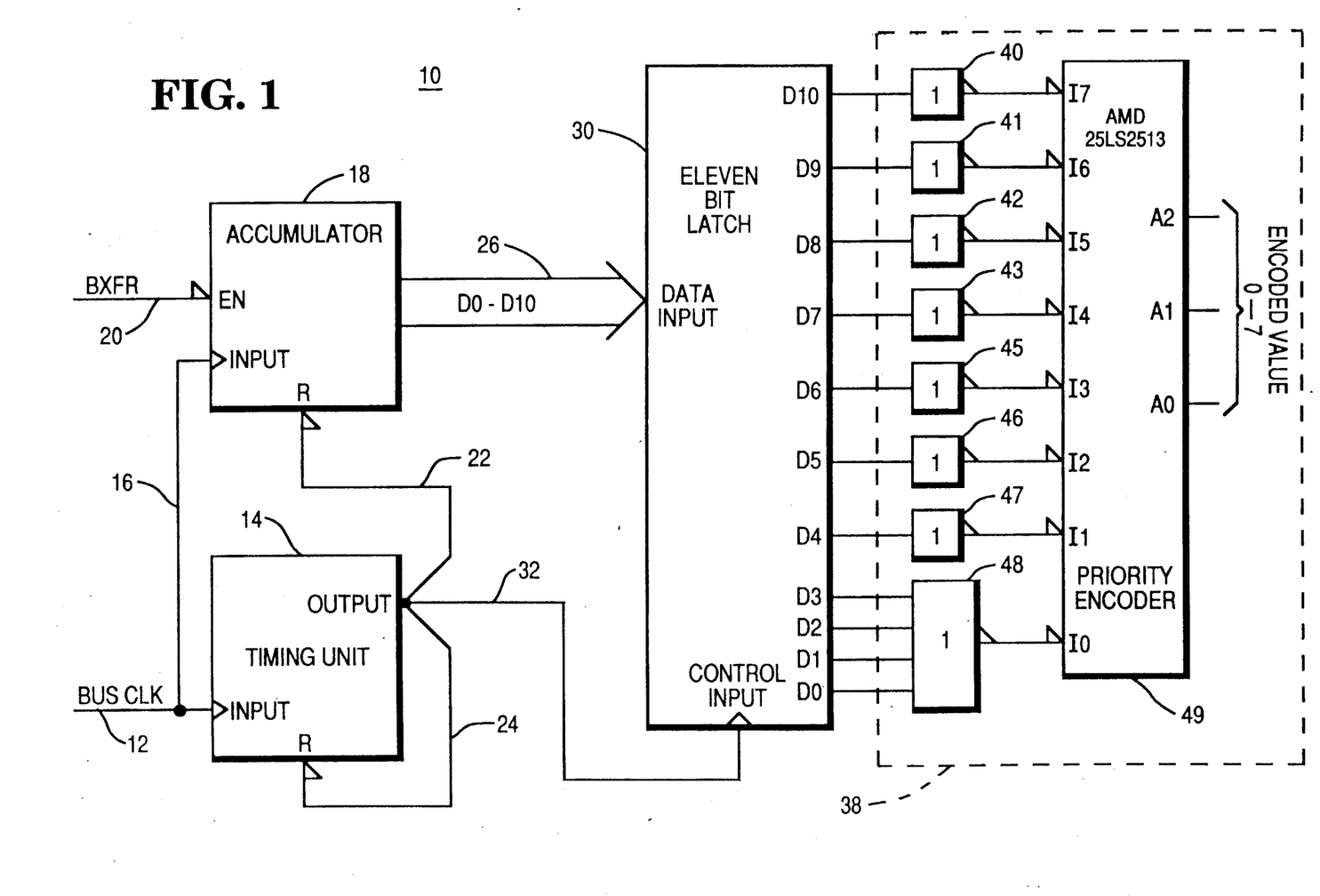
FIG. 1 is a block diagram of an electronic circuit showing one aspect of the invention.

Referring to FIG. 1, there is shown a block diagram of an apparatus 10 for dynamically adjusting a quantity of data words which may be transmitted as a group by an agent upon a system data bus (not shown), in accordance with the present invention. This group of data words is also known as a block. The apparatus 10, dynamically samples the length of each block transmitted by each agent and adjusts the next data block length in order to optimize the efficiency of the system data bus transfers as well as the accessibility of the bus to each agent.

A system bus must have at least one agent which controls the transfer of data among all of the agents. Such an agent, typically a processor, is referred to as a master, which is the designation used by Multibus II, IEEE 796, and many other high speed system bus specifications. Modern systems must have at least one master, but more often they have many masters. If the system has only one master, then the apparatus 10 can be dedicated to the master processor. However, for a multiple master system, the apparatus 10 may be either centrally located and connected to each master, or distributed by duplicating the apparatus 10 and furnishing each master with a separate apparatus 10. In either case, the data transfer efficiency measured by the apparatus 10 will be the same.

The apparatus 10 has two connections to the system data bus. A bus clock signal is communicated by conductor 12 of the apparatus 10. This conductor 12 connects to a clock input terminal of a timing unit 14. The timing unit 14 outputs a pulse from its output terminal at precise intervals. The timing unit 14 is activated by the bus clock signal, and may be a precision analog timer such as a type 555, a digital divider, or a digital counter. If a digital counter is used as the timing unit 14, it may be either an up counter or a down counter, as long as a start count and a terminal count are selected appropriately. Selection criteria for these counts are well known in the art. An analog precision timer, if used as the timing unit 14, would be triggered by the bus clock. After triggering, however, analog techniques and components would determine the end point of the timing period. No matter which type of device is used, after a precise interval an end of interval pulse is outputted and the timing unit 14 is reset. After being reset the next time interval is started by stimulation of the timing unit 14 by the bus clock input from conductor 12. The time period between timing unit output pulses is called the sample interval.

The second connection to the system bus communicates a data-transfer-in-progress signal to an accumulator 18 via a conductor 20. The bus clock signal is also connected by a conductor 16 to the accumulator 18. The accumulator 18 may be a binary accumulator, such as a Texas Instruments type 54LS281; an adder, such as a Texas Instruments type 54LS283; or a counter, such as Texas Instruments type 54LS699. The data-transfer-in-progress signal from the conductor 20 operates as an enabling switch electronically instructing the accumulator 18 to increment, add one, or count the bus clock pulses, depending upon which type of device is selected as the accumulator 18, whenever a data transfer is in progress. The same signal disables the incrementing, adding, or counting of the bus clock pulses when a data transfer is not in progress. Thus, the result in accumulator 18 represents the time period in clock pulses or cycles that the system data bus was actually transferring data.

The accumulator 18 has a reset terminal which is connected to the output terminal of the timing unit 14 by a conductor 22. The timing unit 14 also has a reset terminal which is connected to its output terminal by a conductor 24. The use of the reset terminals and the next function will be discussed below.

The accumulator 18 has an eleven bit output D0–D10 in the preferred embodiment, although other embodiments having less than or more than eleven bits are contemplated; thus, the selection of an eleven bit output is given by way of example and not by way of limitation. The eleven bit output is connected by a local bus 26 to an eleven bit latch 30. The latch 30 has its latch control terminal connected to the output of the timing unit 14 via a conductor 32. The eleven bit accumulator output D0–D10 changes as the accumulator 18 accumulates the total of data transfers in progress during a sample interval. At the end of the sample interval, when the timer unit 14 emits the output control pulse, the present total from the accumulator 18 is latched into the latch 30 by the output control pulse. The latch 30 holds the total from the accumulator 18 that had been set-up on its eleven bit input when the output control pulse occurred. The latch 30 is necessary, because the output control pulse from the timer unit 14 also triggers the reset functions of the timer unit 14 and the accumulator 18 to begin the next sample interval. If the latch 30 did not store the eleven bit total, the total from the sample interval would be reset along with the timing unit 14 and the accumulator 18. Thus, at the end of each sample interval, the latch 30 stores a binary result which corresponds to the amount of time that the system data bus was engaged in the transfer of data. The latch 30 holds this binary result until the next sample interval is over, and the next output control pulse enables the replacement of the binary result therein with a subsequent binary result, and so forth.

Figure 2:
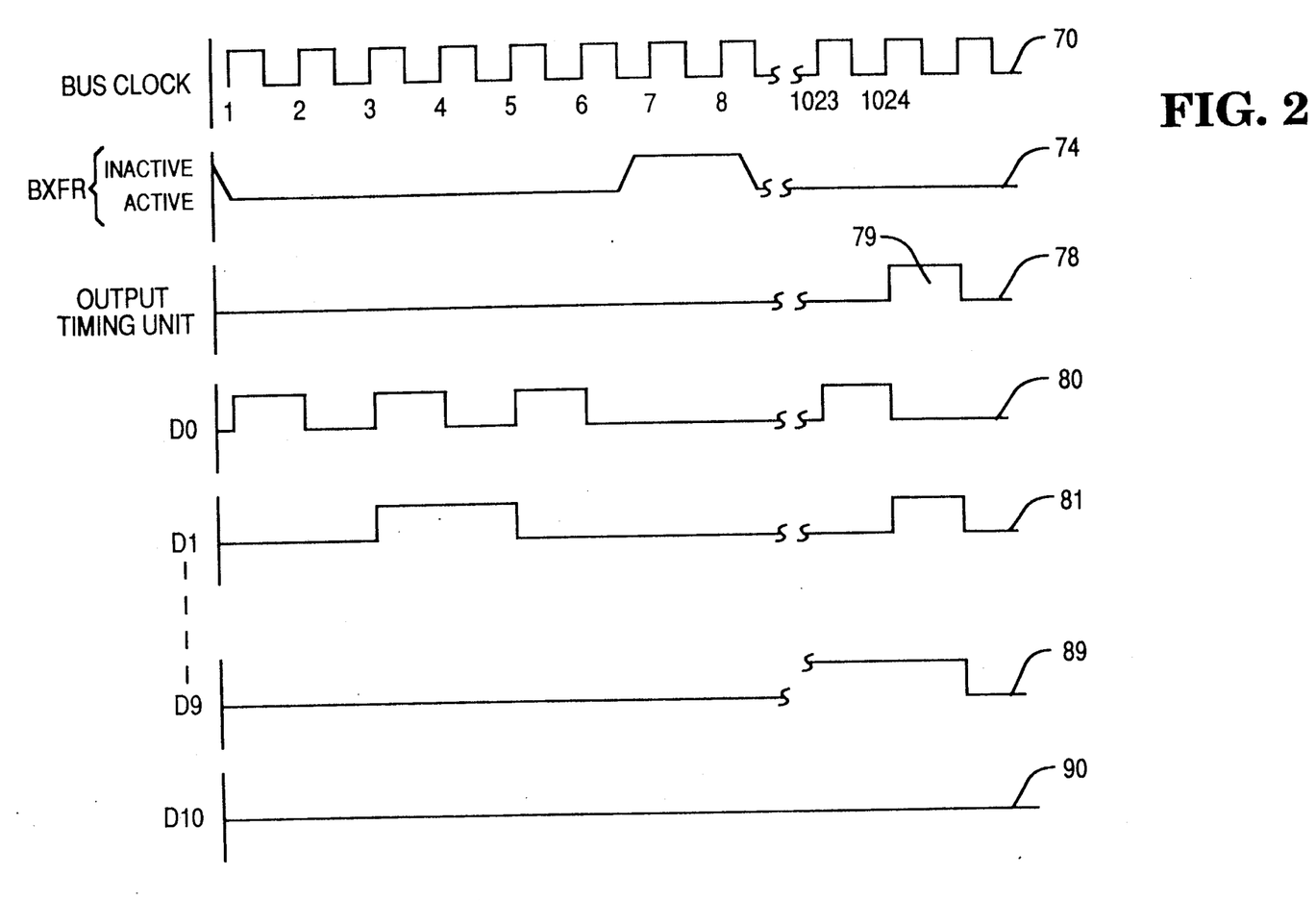
FIG. 2 is a timing diagram useful for the understanding of the electronic circuit shown in FIG. 1.

The waveforms in FIG. 2 show an example of the operation of the timing unit 14, the accumulator 18, and the latch 30. The waveform 70 represents the bus clock signal of the system data bus (not shown). Under normal conditions this waveform 70 is always the same. Waveform 74 represents a simplified data-transfer-in-progress signal (BXFR), which for this example is an active low for all but two bus clock cycles. Waveform 78 represents the output of the timing unit 14. In the example of FIG. 2, the timing unit 14 outputs a reset/latch control pulse upon receipt of the one-thousand-twenty-fourth bus clock pulse, although other sample intervals are also contemplated and this example is given as an illustration of the invention and not as a limitation. The waveforms 80, 81, 89 and 90 represent the signals on the output of the accumulator 18, the bus 26, and the input of the latch 30. These binary values represent the total number of bus clock pulses, i.e. clock periods, that the system bus was busy transferring data during the sample interval. In this particular interval, the result reached 01111111101 in binary notation, or 1022 in decimal notation. The number 01111111101 is subsequently latched into the latch 30 by the output control pulse 79 portion of waveform 78. The output control pulse 79 then resets the timing unit 14 and the accumulator 18, so the representative waveforms 80-90 all return to binary zero.

Referring again to FIG. 1, the latch 30 has eleven outputs, D0-D10. These multiple outputs are connected to a decoder circuit 38. The decoder circuit 38 decodes the outputs D0-D10 of the latch 30 to determine what level of activity the system data bus operated at during the last sample interval. The invention uses this level of activity determination to set or adjust the data block length for any agent transmitting data in the subsequent sample interval. By dynamically setting the data block length, the system can allow very long, very efficient data blocks for communicating input/output or memory data in non-busy systems. Additionally, the system can adjust to short data block lengths in order to allow every agent in a busy system to have rapid access to the system data bus in order to reduce data latency.

The decoder circuit 38 shown in FIG. 1 has a group of NOR gates 40, 41, 42, 43, 44, 45, 46, 47, and 48 connected outputs of the latch 30 D10-D0. Each of the outputs D10-D4 is connected to a single input of a respective NOR gate 40-47. Each NOR gate 40-47 acts as an inverting buffer for its single input. Each output of the NOR gates 40-47 is connected to a corresponding input $I_7$-$I_1$ of a priority encoder 49. The logical inversion by the NOR gates 40-47 is necessary because the priority encoder 49 in the embodiment of FIG. 1 has inputs which are asserted when driven to LOW logic levels.

NOR gate 48 has four inputs which are connected to outputs D3-D0 of the eleven bit latch 30. The output of NOR gate 48 is connected to the lowest priority input $I_0$ of the priority encoder 49. The NOR gate 48 will have a logic HIGH level output when the output of the latch 30 is 00000000000 binary (0 decimal), and will have a logic LOW level output when the output of latch 30 is equal to or greater than 00000000001 binary (1 decimal), but less than 00000010000 binary (16 decimal). The output of NOR gate 48 will vary in a known way for results of 00000010000 base two or more, but, for reasons explained below, NOR gate 48 does not output significant logic levels under these conditions.

The priority encoder 49, such as an Advanced Micro Devices type 25LS2513 or similar device, is an eight bit device, although those skilled in the art will recognize that such devices are readily expandable or cascadable should larger sample sizes be desired. Input $I_7$ is assigned the highest priority which means that if $I_7$ is asserted, which in this case is a LOW logic level, then the binary value of $A_2A_1A_0$ is set to 111 (7 decimal) and the inputs $I_6$-$I_0$ are disabled. Since inputs $I_6$-$I_0$ are disabled, the logic levels on these inputs are "don't cares" as are outputs of NOR gates 41-48 and the outputs D9-D0 from the latch 30. When $I_7$ is not asserted and $I_6$ is asserted at a LOW logic level, the output of the priority encoder $A_2A_1A_0$ is set to 110 binary (6 decimal) and inputs $I_5$-$I_0$ are disabled. Similarly, when one or more of the other inputs are asserted the three bit output of the priority encoder will be the binary representation of the number N which corresponds to the input $I_N$, and all the lower priority inputs $I_{N-1}$ to $I_0$ will be "don't cares".

The output $A_2A_1A_0$ may be used directly to control circuitry within a bus master to dynamically adjust the block length, or it may be processed as one or more and stored within a bus master. Those skilled in the art will recognize that various methods may be used to adjust the next data block length according to the current output $A_2A_1A_0$. For example, an $A_2A_1A_0$ value in the range of 000 to 011 binary tends to indicate a system bus with a considerable amount of unutilized data transfer capability which generally is an indication that the current data block length may be increased. An $A_2A_1A_0$ value in the range of 100 to 101 binary, on the other hand, indicates a fairly good balance of data transfer usage and bus availability and tends to indicate that the current data block length may be near an optimal value for the current operating conditions. An $A_2A_1A_0$ value in the range of 110 to 111 binary however indicates very heavy system bus usage. With such heavy bus usage, other indicators, such as the number of agents requesting system bus access and the number of agents being granted bus access may be considered to ensure that the heavy bus usage is not at the expense of data becoming too latent in any agent. Or, a simpler approach of always shortening the next data block length when the current $A_2A_1A_0$ value is in the 110 to 111 binary range might be implemented to ensure bus accessibility.

Centralized data block adjustment systems would typically be used to directly control each agent according to the current $A_2A_1A_0$ value by setting one or more flags in a flag register. The central system would then drive one or more control lines connected to each agent in order to make any adjustments to the next data block length. Distributed block length adjustment apparatus would typically be used where each master and/or agent reads the output value $A_2A_1A_0$ and adjusts its own next block to a preselected adjustment method as mentioned in the previous paragraph. Distributed adjustment systems are preferred in larger systems because of the extra time and/or bus hardware required to communicate the adjustment control information to each master and agent in a centralized system.

Figure 3:
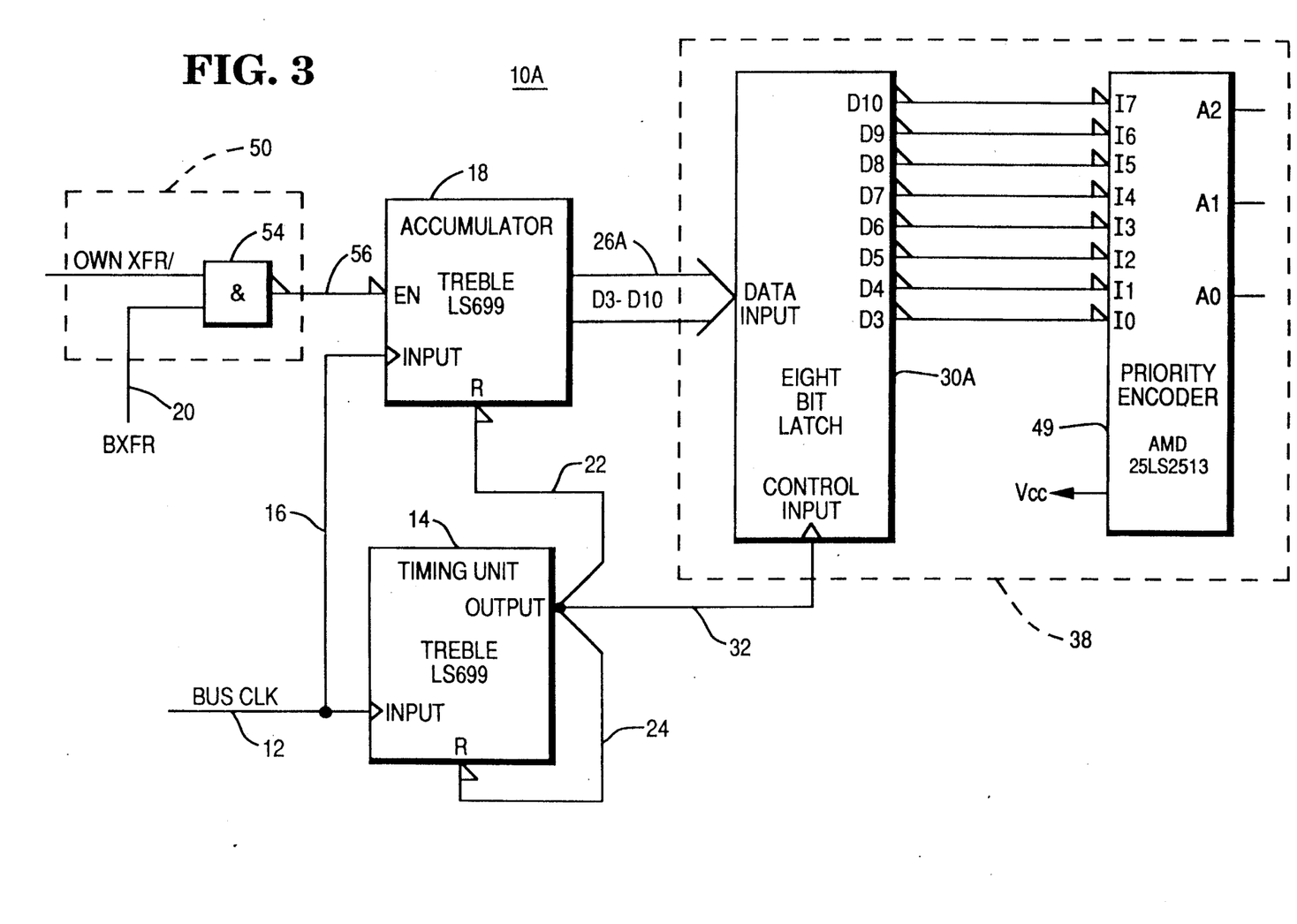
FIG. 3 is a block diagram of an electronic circuit showing a preferred embodiment of the invention.

Referring now to FIG. 3, a preferred embodiment of the invention is shown. The apparatus 10A is functionally similar to the apparatus shown in FIG. 1, with some simplifications and one additional function.

The output connections of accumulator 18 are limited to the eight most significant bits. This recognizes the fact that an accumulator result between 0 and 16 decimal is not significant enough to justify inclusion into the block length adjustment system. Thus, the latch 30A is reduced to the eight most significant bits, the NOR gate 48 may be deleted, and local bus 26A may be reduced to eight conductors. A further simplification is made by selecting a latch 30A which has inverted outputs D10-D3, allowing the NOR gates 40-47 to be deleted from the apparatus 10A.

The timing unit 14 of the apparatus 10A is preferably an eleven bit counter, such as three type LS699 counters that have been trebly cascaded. The accumulator 18 is likewise an eleven bit counter, such as three type LS699 counters which have been trebly cascaded.

The only addition to the apparatus 10A is the input circuit 50. The input circuit 50 uses a NAND gate 54 to add a further function to the operation of the apparatus 10A for a distributed dynamic block length adjusting system. When connected as shown in FIG. 3, the data-transfer-in-progress signal (BXFR) from the system data bus on conductor 20 is logically connected by NAND gate 54 to the conductor 56 and the input of accumulator 18; except when the data transfer-in-progress is being transferred by the master and/or agent with which it is associated. If the data-transfer-in-progress is being transferred by the master and/or agent associated with the apparatus 10A, then the "my own transfer" signal (OWN XFR/) will be an asserted LOW logic level, thereby disabling the logical connection between conductor 20 and accumulator 18 until OWN XFR/ goes to a not asserted, HIGH logic level. Those skilled in the art will appreciate that other combinational logic circuitry could be used to perform this same function, therefore the invention is not deemed to be limited by this preferred example.

By logically isolating each distributed dynamic block length selecting circuit in this manner, a very anomalous condition is avoided. The condition occurs in a system of multiple masters and/or agents when one master or agent is active and all the remaining masters and/or agents are inactive for some reason or another. A typical situation would be during an initial program load. In such a situation, it does not make sense for the single master using the bus to induce itself to change its own next data block length to a shorter length when it is the only master and/or agent currently requesting and using the system bus. Such operation would only adjust the system bus to be less efficient without any corresponding improvement in data latency, assuming there is currently no other master and/or agent awaiting access to the system bus. In such a case, the input circuit 50 isolates the accumulator 18 from the activity of its own master bus unit (not shown), and thereby allows the apparatus 10A to select the longest possible data block length when the system bus is not being used or requested by any other master and/or agent.

In order for the input circuit 50 of the apparatus 10A to operate properly, the sample interval established by the timing unit 14 must be greater than the longest block length selectable for the master associated with the apparatus 10A. Otherwise, the input circuit 50 would allow the apparatus 10A to remain at the greatest block length and monopolize the system bus at the expense of the other masters and/or agents.

Figure 4:
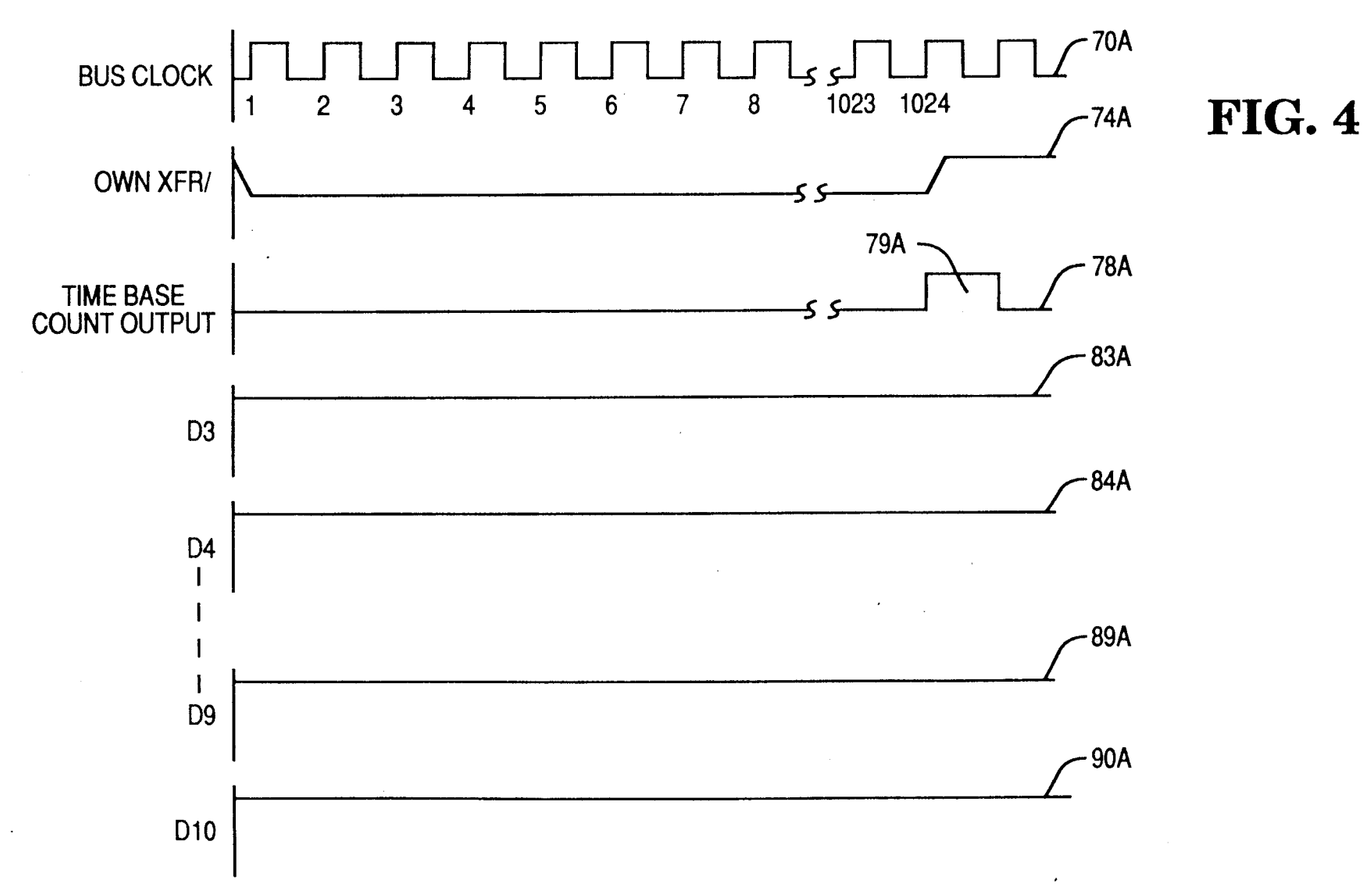
FIG. 4 is a timing diagram useful for understanding the operation of the electronic circuit shown in FIG. 3.

Referring now to FIGS. 3 and 4, the operation of the apparatus 10A will be explained. The waveform 70A is the system bus clock signal, which is regular and periodic. Waveform 74A is a signal from the local master and/or agent associated with the distributed apparatus 10A which instructs the apparatus 10A that this data transfer is from the local master (not shown). Because the input circuit 50 disables any other input signals, that is data-transfer-in-progress signal BXFR, the status of the data-transfer-in-progress signal is a "don't care" signal for the apparatus 10A during the sample interval represented in FIG. 4. The waveform 79A is the same as the waveform of FIG. 2, which outputs a pulse at the end of the sample interval. In the preferred embodiment, this sample interval is 1024 clock cycles or periods long, although variations of this sample interval are contemplated. The sample interval, indicated by the output control pulse 79A, has been selected for simplicity to be equal to the length of the data transfer block indicated by the waveform 74A; however, this is not the best operating condition since it may lead to one master monopolizing the system data bus. Waveforms 83A–90A are all zero since the asserted portion of the waveform 74A keeps the input circuit 50 disabled for the entire sample interval of this example. With a result of zeroes on D3–D10, the decoder/selector circuit 40 will instruct its local master and/or agent (not shown) to select the greatest block length available.

Thus, it will now be understood that there has been disclosed a method and apparatus for dynamic data block length adjustment which dynamically adjusts the data block length of each master and/or agent to provide more efficient system bus usage. This method and apparatus allows for the balancing of efficient bus usage with the competing concern of data latency in masters and/or agents awaiting bus access. While the invention has been particularly illustrated and described with reference to a preferred embodiment thereof, it will be understood by those skilled in the art that various changes in form, details, and applications may be made therein. For example, with some modifications to the decoder circuit the apparatus could be used to adjust the time of system bus usage per agent instead of the length of a block. Furthermore, with the addition of an incrementing/decrementing register at the output of the priority encoder and a comparator for comparing the output of the priority encoder with the output of the incrementing and decrementing register, a dynamic block length adjustment circuit is provided which is constrained to adjusting at most to the next longer or next shorter block length within the total adjustment range from the currently selected block length. It is accordingly intended that the appended claims shall cover all such changes in form, details and applications which do not depart from the true spirit and scope of the invention.

What is claimed as new and desired to be secured by Letters Patent of the United States is:

1. A bus data block length selection apparatus for use with a data bus having a clock signal and a data-transfer-in-process signal, comprising:
   time base means connected for receiving said clock signal and for providing a pulse output after a preselected sample period;
   accumulator means responsive to said pulse output and said data-transfer-in-process signal for accumulating a total of said clock signals within each preselected sample period that jointly occur with said data-transfer-in-process signal and outputting a digital signal representative of said total; and
   decoder means responsive to said pulse output and to said digital signal output for decoding said digital signal output and selecting an appropriate length for a subsequent bus data block according to the total of said clock signals accumulated in said preselected sample period.

2. The bus data block length selection apparatus according to claim 1, wherein said time base means is a counter, counting a preselected number of clock cycles to provide said preselected time period.

3. The bus data block length selection apparatus according to claim 1, wherein said time base means is a divider, dividing a frequency of said clock signals to provide said preselected time period.

4. The bus data block length selection apparatus according to claim 1, wherein said time base means is an analog timer, providing a said preselected time period triggered by said clock signal and controlled by an analog time constant.

5. The bus data block length selection apparatus according to claim 2, wherein said preselected time period is very much greater than a time period of a longest of said appropriate length data blocks.

6. The bus data block length selection apparatus according to claim 3, wherein said preselected time period is very much greater than a time period of a longest of said appropriate length data blocks.

7. The bus data block length selection apparatus according to claim 4, wherein said preselected time period is very much greater than a time period of a longest of said appropriate length data blocks.

8. A bus communication period selection apparatus for use with a data bus having a clock signal and a data-transfer-in-process signal, comprising:
   time base means for providing a pulse output after a preselected sample period connected to said clock signal;
   accumulator means responsive to said pulse output and said data-transfer-in-process signal for accumulating a total of said clock signals within each preselected sample period that jointly occur with said data-transfer-in-process signal and outputting a digital signal representative of said total; and
   decoder means responsive to said pulse output and to said digital signal output for decoding said digital signal output and selecting an appropriate maximum communication period for a subsequent data transfer by a bus agent according to the total of said clock signals accumulated in said preselected sample period.

9. The bus communication period selection apparatus according to claim 8, wherein said time base means is a counter, counting a preselected number of clock cycles to provide said preselected time period.

10. The bus communication period selection apparatus according to claim 8, wherein said time base means is a divider, dividing a frequency of said clock signals to provide said preselected time period.

11. The bus communication period selection apparatus according to claim 8, wherein said time base means is an analog timer, providing a said preselected time period triggered by said clock signal and controlled by an analog time constant.

12. The bus packet length selection apparatus according to claim 9, wherein said preselected time period is very much greater than a time period of a longest of said appropriate length data packets.

13. The bus packet length selection apparatus according to claim 10, wherein said preselected time period is very much greater than a time period of a longest of said appropriate length data packets.

14. The bus packet length selection apparatus according to claim 11, wherein said preselected time period is very much greater than a time period of a longest of said appropriate length data packets.

15. A bus data block length selection apparatus for use with a master of a multiple master data bus, said data bus having a clock signal, a local data-transfer-in-process signal and an external data-transfer-in-process signal, comprising:
   time base means for providing a pulse output after a preselected sample period connected to said clock signal;
   accumulator means responsive to said pulse output, said local data-transfer-in-process signal, and an external data-transfer-in-process signal for accumulating a total of said clock signals within each preselected sample period that jointly occur with said external data-transfer-in-process signal and outputting a digital signal representative of said total; and
   decoder means responsive to said pulse output and to said digital signal output for decoding said digital signal output and selecting an appropriate length for a subsequent bus data block according to the total of said clock signals accumulated in said preselected sample period.

16. The bus data block length selection apparatus according to claim 15, wherein said time base means is a counter, counting a preselected number of clock cycles to provide said preselected time period.

17. The bus data block length selection apparatus according to claim 15, wherein said time base means is a divider, dividing a frequency of said clock signals to provide said preselected time period.

18. The bus data block length selection apparatus according to claim 16, wherein said preselected time period is very much greater than a time period of a longest of said appropriate length data blocks.

19. The bus data block-length selection apparatus according to claim 17, wherein said preselected time period is very much greater than a time period of a longest of said appropriate length data blocks.

20. An apparatus for controlling a length of a data block on a data bus, comprising:
   a counter means connected to a bus clock for counting a first plurality of bus clock cycles and outputting a reference signal upon completion of said counting;
   a second counter means connected to said bus clock, said reference signal output and to a data-transfer-in-process signal output for counting a second plurality of bus clock cycles that occur concomitantly with said data-transfer-in-process signal, said second counter outputting a plurality of parallel signals corresponding to a plurality of most significant digits of said second plurality count;
   means for latching said plurality of parallel signals connected to said second counter output and said reference pulse, said latching means responsive to said reference pulse to enable said latch means to latch said parallel signals therein and hold said plurality of signals as outputs thereof; and
   decoder means responsive to said latch outputs for selecting a more appropriate data block length for a subsequent data block transmission on said data bus.

21. The apparatus for controlling a length of a data block according to claim 20, wherein a period of time between the outputting of subsequent reference signals is substantially greater than a period of time required to transfer the greatest length data block.

22. An apparatus for controlling a length of a data block on a data bus connecting multiple bus masters, comprising:
   a counter means connected to a bus clock for counting a first plurality of bus clock cycles and outputting a reference signal upon completion of said counting;

a second counter means connected to said bus clock, said reference signal output, a local data-transfer-in-process signal output and an external data-transfer-in-process signal output for counting a second plurality of bus clock cycles that occur concomitantly with said external data-transfer-in-process signal, said second counter outputting a plurality of parallel signals corresponding to a plurality of most significant digits of said second plurality count;

means for latching said plurality of parallel signals connected to said second counter output and said reference pulse, said latching means responsive to said reference pulse to enable said latch means to latch said parallel signals therein and hold said plurality of signals as outputs thereof; and decoder means responsive to said latch outputs for selecting a more appropriate data block length for a subsequent data block transmission on said data bus.

23. The apparatus for controlling a length of a data block according to claim 22, wherein a period of time between the outputting of subsequent reference signals is substantially greater than a period of time required to transfer the greatest length data block.

24. A method for controlling a length of a data block of a data bus, comprising:

counting a preselected number of cycles of a reference clock of said data bus;

generating a control pulse when said preselected number of cycles has been counted;

counting a second number of cycles of said reference clock that occur concomitantly with a data-transmission-in-process signal of said data bus to measure a level of data block traffic during said preselected number of cycles;

outputting a plurality of binary signals corresponding to a plurality of most significant bits of said second number;

storing said plurality of binary signals in a storage means controlled by said control pulse; and decoding said binary signals stored in said storage means for selecting the length of a subsequently transmitted data block to efficiently optimally operated the data bus according to the level of bus traffic.

* * * * *